United States Patent [19]

Palum

[11] Patent Number: 5,642,149
[45] Date of Patent: Jun. 24, 1997

[54] APPARATUS AND METHOD FOR PRINTING WITH A NON-REFRACTIVE IMAGING SYSTEM

[75] Inventor: Russell Jay Palum, Rochester, N.Y.

[73] Assignee: Eastman Kodak Company, Rochester, N.Y.

[21] Appl. No.: 124,113

[22] Filed: Sep. 20, 1993

[51] Int. Cl.$^6$ .................... B41J 2/47; B41J 2/45; G02B 27/40; G02B 5/10
[52] U.S. Cl. .......... 347/241; 347/238; 347/243; 359/858
[58] Field of Search .................. 347/243, 241, 347/260, 256, 134, 232; 359/853, 858, 857, 613, 869

[56] References Cited

U.S. PATENT DOCUMENTS

| | | | |
|---|---|---|---|
| 4,443,058 | 4/1984 | Bosserman | 359/613 |
| 4,797,691 | 1/1989 | Aklyoshi et al. | 347/232 |
| 4,821,154 | 4/1989 | Kotecki et al. | 362/20 |
| 4,918,465 | 4/1990 | Morita | 347/232 |
| 4,980,700 | 12/1990 | Ng | 347/241 |
| 5,121,146 | 6/1992 | Smith et al. | 347/238 |
| 5,175,783 | 12/1992 | Tatoh | 385/93 |
| 5,212,588 | 5/1993 | Viswanathan et al. | 359/355 |

FOREIGN PATENT DOCUMENTS

| | | | |
|---|---|---|---|
| 0 321 143 | 6/1989 | European Pat. Off. | H04N 1/036 |

OTHER PUBLICATIONS

W.B. Wetherell and M.P. Rimmer; General Analysis of Aplanatic Cassegrain, Gregorian, and Schwarzschild Telescopes; Dec. 1972, vol. 11, No. 12; Applied Optics; pp 2817–2832.

Paul G. Hannan; General Analysis of Two–Mirror Relay Systems; Feb. 1, 1992; vol. 31, No. 4, Applied Optics; pp. 513–518.

Primary Examiner—Benjamin R. Fuller
Assistant Examiner—David Yockey
Attorney, Agent, or Firm—Svetlana Z. Short

[57] ABSTRACT

A printing apparatus includes an imaging system which focuses a plurality of different color LED sources on a photosensitive recording medium without use of any refractive optics. The imaging system comprises two concave mirrors having reflective surfaces, each of which is a conic section, and a baffle located between the mirrors. Each of the mirrors includes an aperture and the baffle is located between the apertures of the mirrors. A printing method utilizing the apparatus includes reflection of light generated by the LED sources between the mirrors following a series of zigzag turns, convergence of the light through an aperture in one of the mirrors, and formation of an image on a photosensitive recording medium without passing through refracting optics, wherein the baffle blocks light from propagating directly towards an imaging surface without reflecting in the imaging system.

27 Claims, 8 Drawing Sheets

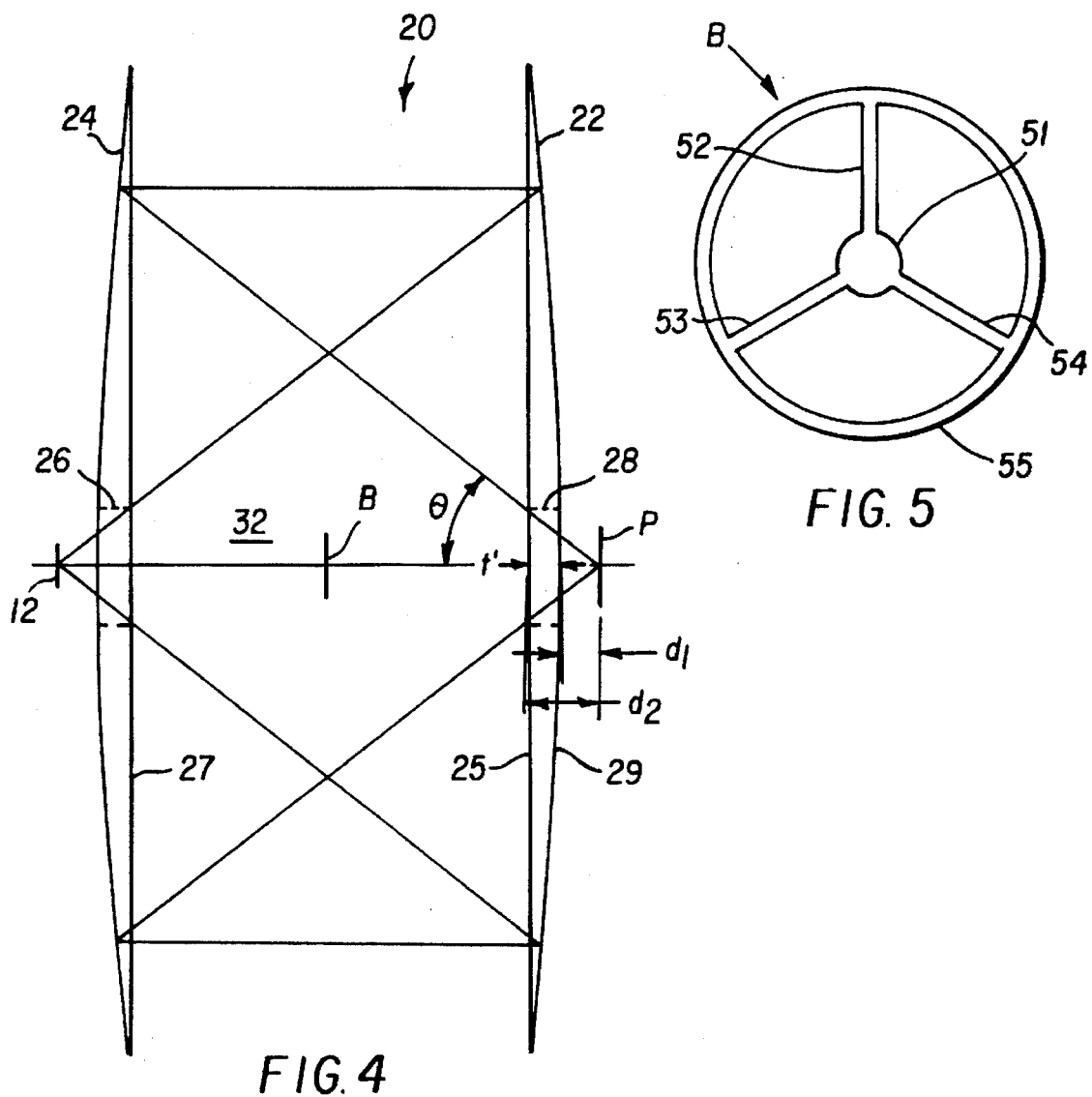
FIG. 4
FIG. 5
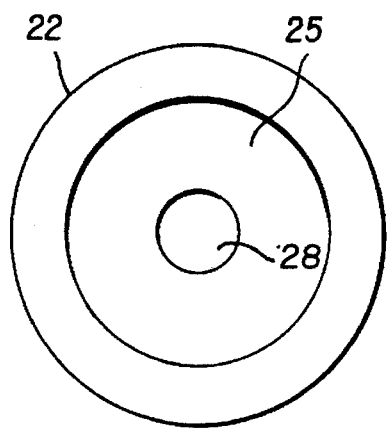
FIG. 6A
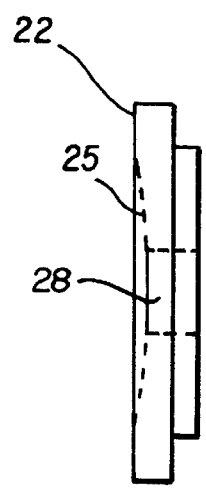
FIG. 6B ns a central
APPARATUS AND METHOD FOR PRINTING WITH A NON-REFRACTIVE IMAGING SYSTEM

CROSS REFERENCE TO COPENDING APPLICATIONS

Cross-references are made to commonly assigned, copending U.S. Pat. Application Ser. No. 123,839, filed Sept. 20, 1993, in the names of Douglas H. Smith et al and entitled "Method and Apparatus for Exposing Photosensitive Media With Multiple Light Sources".

BACKGROUND OF THE INVENTION

1. Field of the Invention

This invention relates to improved optical or imaging systems for use in electro-optical color printers and method for using such an optical system.

2. Description Relative to Prior Art

A typical electro-optic printer comprises a printhead having a plurality of point-like electro-optic recording elements, such as light emitting diodes (LEDs) for providing a source of light and a refractive optical system for focusing or imaging the light emitted by such LEDs on a photosensitive material. In known color printers for recording on color photographic film or paper, several LEDs are used that emit light with different spectral content. The LED light is typically red, blue and green.

When a single refractive imaging system (also called a lens system) is used to focus light beams of different wavelengths, such a lens system is likely to suffer from color aberrations. Correction of color aberrations in a lens system requires additional lens elements and also often requires the use of expensive glass materials. In addition, a typical printer application requires that the lens system have a low F number to ensure sufficient light for exposure. A low F number is also difficult to achieve without having a large number of lens elements. Thus, a lens system having a low F number and, which is also color corrected, is complex, has many optical elements and is usually expensive to manufacture.

An alternative solution is to use multiple lens systems, where each lens system focuses different color beams. Not only are multiple lens systems expensive, but they also have to be aligned with respect to each other and each of them has to be aligned to the photosensitive medium.

SUMMARY OF THE INVENTION

It is therefore an object of the present invention to overcome the foregoing problems of the prior art.

It is another object of the present invention to provide an optical system for a printer which is simple, has relatively few optical elements, is inexpensive to manufacture, has a low F number, and which does not suffer from color aberrations.

To attain the above objects, in accordance with one aspect of the invention, an imaging system comprises:

(a) first and second mirrors each having a curved reflective surface, the curved reflective surfaces facing one another, the first mirror having an outlet opening to accommodate light emitted by light emitting sources, wherein the light from the light sources reflects from the first mirror towards the second mirror and upon reflection from said second mirror propagates through the outlet opening and is imaged upon an imaging surface; and (b) a baffle located in the space between the first mirror and the second mirror, the baffle having a central portion, the central portion being aligned with the outlet opening so as to block light emitted from the sources from propagating directly towards the imaging surface without reflecting in the imaging system.

According to another aspect of the present invention, the imaging surface is a photosensitive surface.

In accordance with one aspect, the invention is directed to an electro-optic printer apparatus which comprises:

(a) a matrix array of point-like light emitting sources, the sources emitting light in a plurality of colors;

(b) an imaging system comprising a first mirror and a second mirror, each of the mirrors having a curved reflective surface, the curved reflecting surfaces facing one another, said first mirror having an outlet opening to accommodate the light emitted by the light emitting sources. The light emitting sources are located adjacent to the second mirror and emit the light towards the first mirror. The light reflects from the first mirror towards the second mirror and upon reflection from the second mirror propagates through the outlet opening and is imaged upon an imaging surface;

(c) means for supporting the imaging surface on which the image plane is located, which imaging surface is located adjacent to said first mirror; and (d) a baffle located relative to said emitting sources so as to block light emitted from the emitting sources from propagating directly towards the imaging surface without reflecting in the said imaging system.

According to yet another aspect of the present invention, a device for printing images comprises: a pair of reflector members disposed in opposed relationship with an air-space gap therebetween, the opposed surfaces of said reflector members providing light reflecting surfaces;

a light source disposed at or adjacent one end of the reflector members for emitting light into the air-space gap between the reflector members, and a light sensitive medium is disposed at or adjacent the other end of the reflector members for receiving a light beam passed thereto under repetitive reflections between the reflector members; and a non-transparent member disposed in the air-space gap between the reflector means, said non-transparent member preventing light from the light source from directly reaching the light sensitive surface.

BRIEF DESCRIPTION OF THE DRAWINGS

Description of the preferred embodiments of the invention will be made with reference to the accompanying figures in which:

FIG. 4 is a view similar to that of FIG. 2 but enlarged and with certain details emitted for purposes of clarity and illustrating typical light ray paths in the optical system;

FIG. 5 illustrates a light baffle used in the optical system of FIG. 2;

FIGS. 6a and 6b are respectively front and side elevational views of a mirror used in the optical system of FIG. 2;

DESCRIPTION OF THE PREFERRED EMBODIMENTS

Because electro-optic printer apparatus are well known the present description will be directed in particular to elements forming part of or cooperating more directly with the present invention. Apparatus not specifically shown or described herein are selectable from those known in the prior art.

With reference to FIGS. 1–4, a preferred embodiment of an electro-optic printer apparatus includes a plurality of selectively activatable point-like light or other actinic radiation sources, such as an n ×m matrix array 12 of LEDs. A reflective optical or imaging system 20 images these LEDs onto a photosensitive medium such as a photographic film or paper. The photosensitive medium is held stationary in a hollow, generally cylindrical form with a photosensitive surface 40 facing inwardly. The reflective imaging system and the LED assembly are incorporated in what is called a rotator disc assembly which is capable of translational as well as rotational motion within the hollow space defined by the photosensitive medium. Thus, the LED array and the imaging system that focuses the LEDs move by simultaneous translational movement along the axis of the cylinder and rotational movement about the axis of the cylinder to expose the required area of the photosensitive medium.

Figure 1:
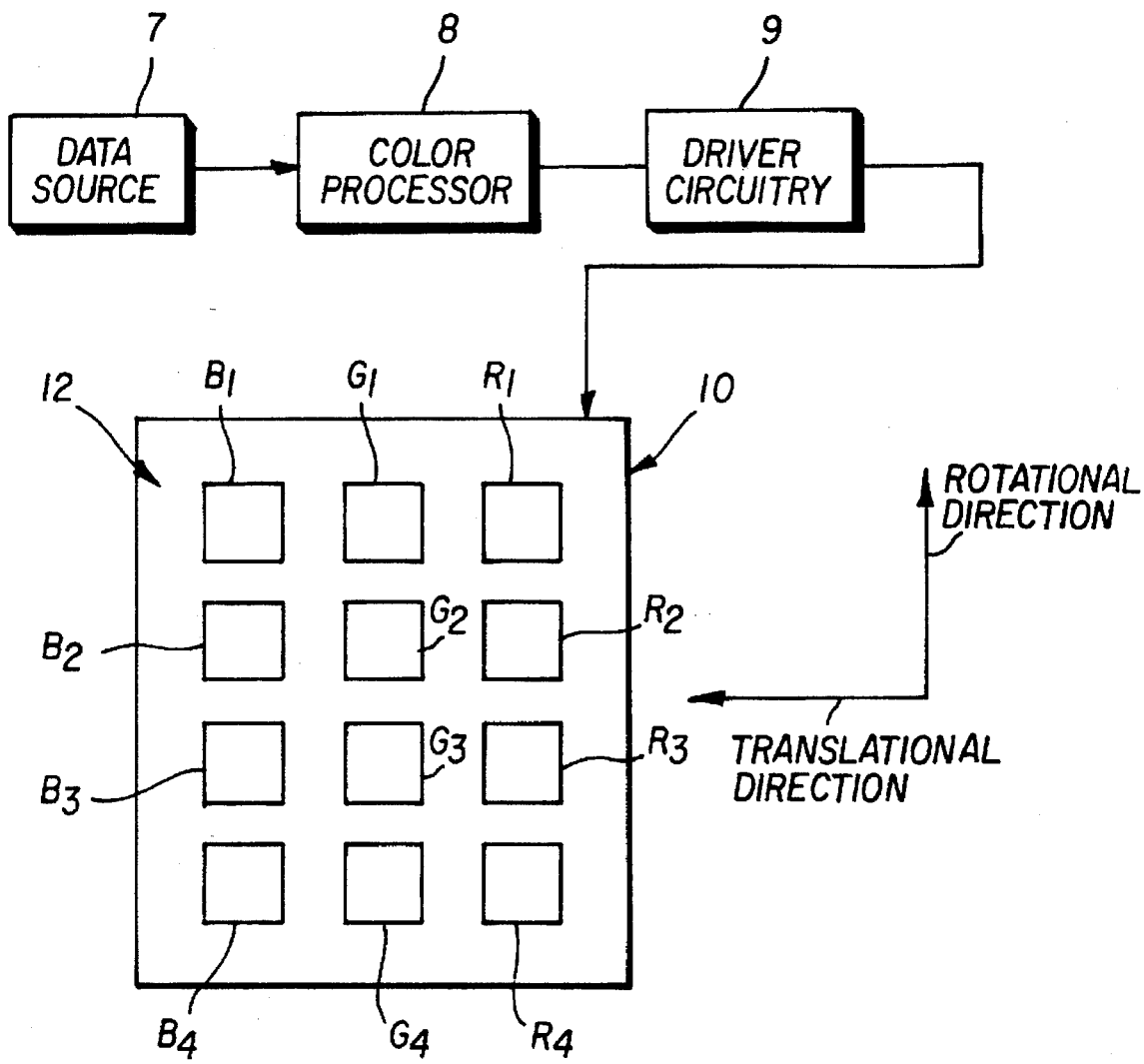
FIG. 1 is a schematic, greatly enlarged, of an assembly of LEDs that serve as a light source for the printer apparatus of a preferred embodiment of the invention.

FIG. 1 is a schematic drawing of the LED assembly 10. As can be seen, it includes 12 LEDs, $R_1$-$R_4$, $G_1$-$G_4$ and $B_1$-$B_4$ arranged into an array 12 that comprises three columns and four rows supported on a suitable planar substrate 14. The three columns each correspond to red, green and blue light-emitting LEDs respectively. Each column thus has four LEDs that emit light of the same color. FIG. 1 also indicates the orientation of the rows and columns of LEDs relative to their direction of rotation and translation.

In recording on the photosensitive medium, three columns of four pixels each on the recording medium will receive simultaneous exposures. One column of pixels will be exposed by the red LEDs, one column will be exposed by the green LEDs and one column by the blue LEDs (this assumes, of course, that all 12 pixel areas on the recording medium are to be so exposed). As the rotator disc assembly and thus the imaging system 20 and the LED assembly 10 move along a helical path (which comprises both rotational as well as translational movements), a new column of pixels will be exposed by the blue LEDs. The column that had been exposed by the blue LEDs will receive exposure from the green emitting LEDs and the column that had been exposed by the green LEDs (and also previously by the blue LEDs) will now be exposed by the red LEDs. Thus, eventually each column of pixels in the image, specifically at each pixel location in the column, can be exposed by blue, green and red LEDs as the rotator disc assembly translates. Additionally, in the course of rotational movement of the rotator disc assembly, each pixel can be exposed by four LEDs of the same color. Thus, the printer has the capability to record a pixel on the recording medium using combinations of the 12 LEDs to provide great exposure latitude and color fidelity.

Figure 2:
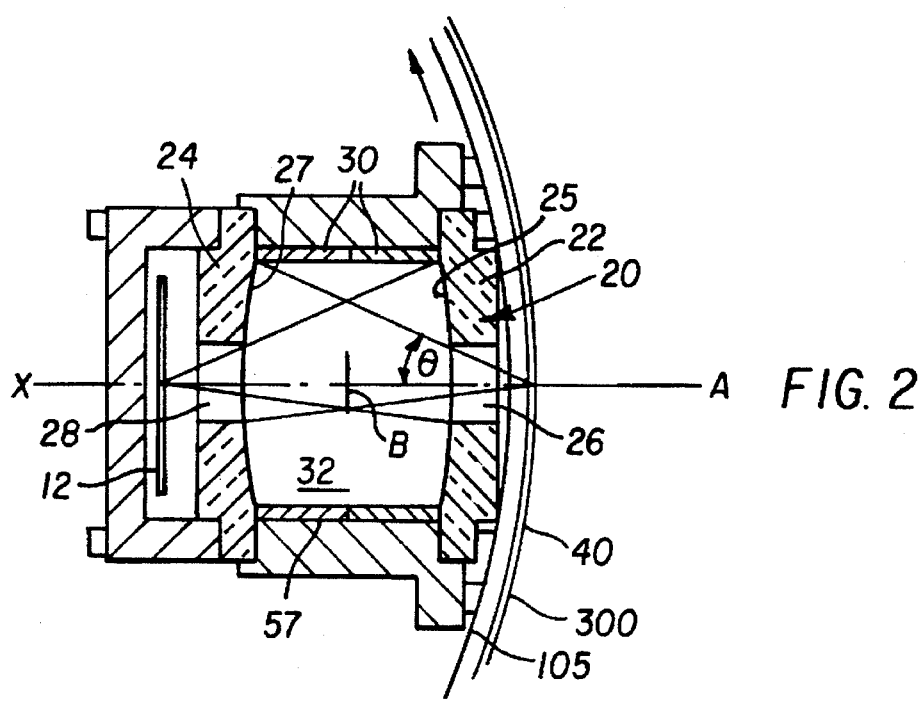
FIG. 2 is a schematic showing in cross-section the optical system of the preferred embodiment for use in focusing light from the LED assembly of FIG. 1.
Figure 3:
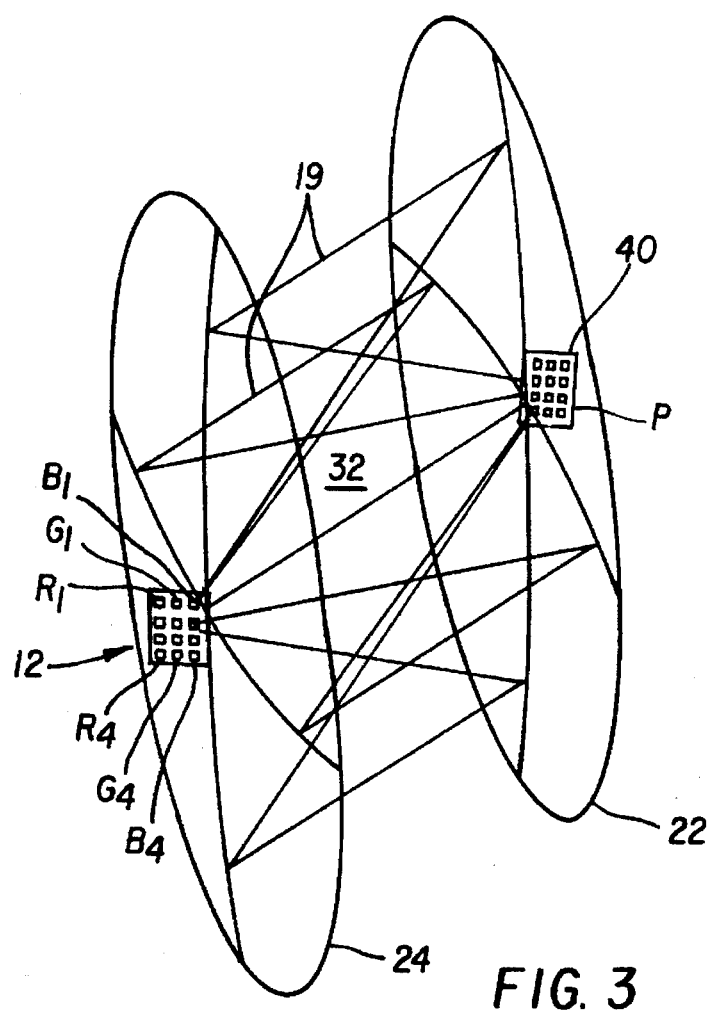
FIG. 3 is a schematic in perspective of the optical system of FIG. 2. It provides a three-dimensional view and illustrates the operation of the optical system.

With reference specifically now to FIGS. 2 and 3, the imaging system 20 for imaging the LEDs in the LED assembly 10 includes first and second hyperbolic mirrors 22, 24 which have their curved, and more specifically, concave reflecting surfaces 25, 27 respectively facing each other. A circular central aperture 26, 28 is respectively formed in each of these mirrors and these apertures are axially aligned with the optical axis A of the optical system. The LED array 12 containing three columns of LEDs, corresponding to red, blue and green light-emitting diodes, is located externally of a space 32 defined by the concave reflecting surfaces 25, 27 of the two mirrors and a spacer 30 which separates the two mirrors at a fixed distance apart. The LED array 12 is located proximate the external portion of aperture (also called an inlet opening) 28 of mirror 24. Light from the 12 LEDs simultaneously enters through this aperture into the space 32 and is reflected first by the first or far mirror 22 and then secondarily by the near or second mirror 24. The light converges to exit through aperture (or outlet opening) 26 of the far mirror 22 and impinges upon the photosensitive medium whose surface 40 is shown schematically. As can be seen, the photosensitive medium is shaped into a generally cylindrical configuration with the photosensitive surface 40 facing radially inwardly. The photosensitive medium may be of a size such that when it is curved into a generally cylindrical form that there be a space or gap between the opposite ends of the medium so that medium itself doesn't form a complete cylinder. Light rays 19 from the LEDs which are focused by the mirrors are thereby imaged upon the surface 40 of the medium after having reflected off the mirrors in a series of zigzag turns. In this specific embodiment, the light rays 19 reflecting from the first mirror are collimated. This ensures the symmetry of the design and minimizes the cost of manufacturing because only one mirror type needs to be manufactured. In addition, this symmetrical arrangement keeps the imaging system compact by keeping the clear apertures of the mirrors small. To ensure that all light is properly reflected and doesn't pass to the image surface without reflection from each mirror, there is provided within space 32 a baffle B that blocks unwanted rays. Further details relative to the baffle are described below with reference also to FIG. 5. It should be understood that light from the 12 LEDs simultaneously exposes 12 corresponding pixel areas on the record medium. The exposure time for each LED is generally for a short, strobe-like duration. The exposure time for each color of LED may be different, but all the LEDs of one color have the same exposure time. Exemplary exposure times for each LED is between 5 and 100 microseconds. Recall too, from above that not all 12 LEDs need be on simultaneously. LEDs that will be on during a particular time period for recording respective pixels will be dependent upon data signals that control activation of the LEDs. As is well known in the electro-optic recording arts, activation of particular LEDs is controlled by suitable driver circuitry which controls whether or not a particular LED is to be activated to record a pixel and the duration of activation of that LED during a pixel recording period. As also noted above, through movement of the array relative to the medium, as many as 12 LEDs in this embodiment may be used sequentially to record a single pixel. It is preferred in this embodiment to expose a pixel that is to receive some red exposure with all four red LEDs. Similarly, if this pixel is also to receive some blue exposure, it is exposed with all four blue LEDs. Exposures in green would also be through use of all four green LEDs. Circuitry for enabling the LEDs in the manner described above is not critical to the imaging system of this invention. For example, an image of an original to be reproduced may be scanned from a data source such as a document scanner or a computer 7. The scanned data is then processed in color processor 8 to generate color corrected data for controlling the levels of driver current for each of the red, green and blue LEDs. Each LED of the same color will receive the same level of driver current. The driver circuitry 9 generates this current and controls the activation times of the LEDs in accordance with the data. The data to the driver circuitry will be properly synchronized so that the appropriate data is available to drive the LEDs at the appropriate time in sequence. LED arrays of the type referred to herein may be assembled individually onto the planar substrate and appropriate electrical leads provided to connect respective LEDs to the driver circuitry. In order to compensate for misalignment of the placement of the LEDs in the array, the LED assembly 10 may include an aperture plate, not shown, with precise formed openings, one for each LED, may be fit directly over the LEDs to cooperate with the LEDs to define light-emitting recording elements that are precisely spaced at say 1/300 inches apart in each of the two dimensions of the array. The apertures may, like the LEDs, be each square in shape, but of smaller dimension than an LED.

The distance $d_1$ (see FIG. 4) between the rear surface of the mirror 22 and the image plane is determined by the cone angle $\theta$ of the emergent light. In other words, the larger the cone angle $\theta$ (or the smaller the F number), the smaller the distance $d_1$ and thus the smaller the size of the aperture 26 in the far mirror 22. When a large cone angle $\theta$ (small F number) imaging system is designed, enough clearance $d_2$ between the reflective surface 25 of the far mirror 22 and the image plane should also be provided for to obtain adequate mirror structure thickness t'. A small F number system allows a greater throughput of light in the system requiring a smaller number of LEDs. It has been found that even low F number imaging systems, such as f/1.2 or f/0.83, still require four LEDs of each color to get enough light to provide a maximum exposure in that color onto certain color photographic papers in recording a pixel. A smaller cone of outcoming light (i.e. a high F number) may not provide enough light for certain applications. Thus, any substantial decrease in the cone angle $\theta$ may necessitate a larger matrix of LEDs or require the LEDs to be overdriven and thus adds additional expense and/or power consumption. The inventor has discovered that the all-reflective system as shown in FIG. 4 is uniquely suited to provide a high cone angle $\theta$ (or a low F number) as required in a printer application. In addition, an all-reflective system does not suffer from chromatic aberrations inherent in a refractive system and thus provides a better overall image quality since the all-reflective system does not alter the optical path in accordance with wavelength as may occur in a system with refractive optics. A two mirror imaging system is simple and inexpensive to produce and inherently provides for accurate positioning of exposed pixels on the recording medium. In addition, a single imaging system in a printer head is not required to be aligned with additional optical systems and thus eliminates problems of alignment common to multiple optical refractive systems described in the prior art.

With reference now to FIGS. 4 and 5, a baffle B is made from an opaque material and preferably is painted with flat black paint. It is comprised of a central portion 51 that is aligned with the central apertures of the two mirrors for blocking direct light emanating from the LED matrix array and propagating towards the image plane P. The diameter of the central portion 51 is 4.25 mm. Narrow radial legs on the baffle 52, 53 and 54 connect the central portion 51 to a perimeter mounting ring 55. The width of each leg is 1.00 mm. Ring 55 is held in place by a barrel 57. The inner diameter of the ring 55 is 21.00 mm and its outer diameter is 22.96 mm. Some of the light emitted by the LEDs is thus lost due to absorption by the baffle B.

The imaging system of the first embodiment is shown in FIG. 3 and is designed to work at a f/1.2 aperture and operates at a working f/1.4 due to light loss due to the baffle. The f/1.2 is the working F Number of the imaging system in this embodiment when the imaging system operates at 1:1 image-object conjugates.

The mirrors used in the imaging system shown in FIG. 2 are hyperbolic and the imaging system operates at 1:1 which provides for a symmetric design and the use of identical mirrors. The mirror's structure is shown in FIGS. 6a and 6b. The mirror 22 has a reflective surface 25 which is concave and which shape is a slightly hyperbolic section described by the equation $$Z = \frac{CX^2}{1 + \sqrt{1 - SC^2X^2}}$$

where Z is the sag of the surface corresponding to the radial distance (or height) X in its aperture. C is a radius of curvature and is equal to $-0.02$ and S is a conic constant and is equal to $-0.005$. The dimensions of the mirror are given in mm. For example, the diameter of the reflective surface 25 is 21 mm, while the size or diameter of the mirror 22 is 30 mm. The diameter of the aperture 28 is 6.6 mm and the depth of the mirror structure is 5.1 mm. The distance 32 between the two mirrors is 18 mm measured along the optical axis. The distance between the array 12 and the vertex of the reflective surface 25 of mirror 22 is 25 mm. Since the imaging system is symmetrical, the distance from the vertex of the reflective surface 27 of mirror 24 to the photosensitive surface 40 is also 25 mm. If a magnification is different than 1:1, the required imaging system will not be symmetric and the mirror focal length will be different. Although this embodiment uses two hyperbolic mirrors, spherical, parabolic, other conic cross sections or an aspheric profile are also possible choices depending on the exact system configurant. The mirrors may be manufactured using a plastic injection molding process and then aluminized. This technique keeps the cost of the optical system to low levels.

Figure 7B:
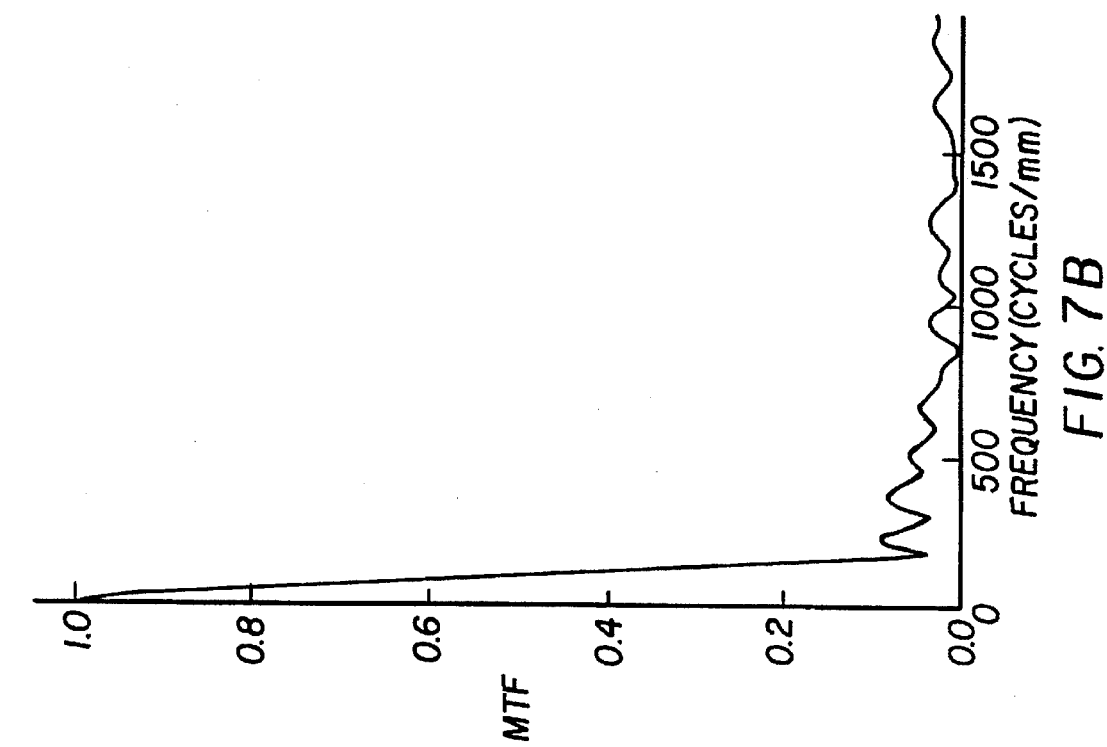
FIGS. 7a and 7b are graphs which illustrate the performance of an optical system made according to one preferred embodiment of the present invention.
Figure 7A:
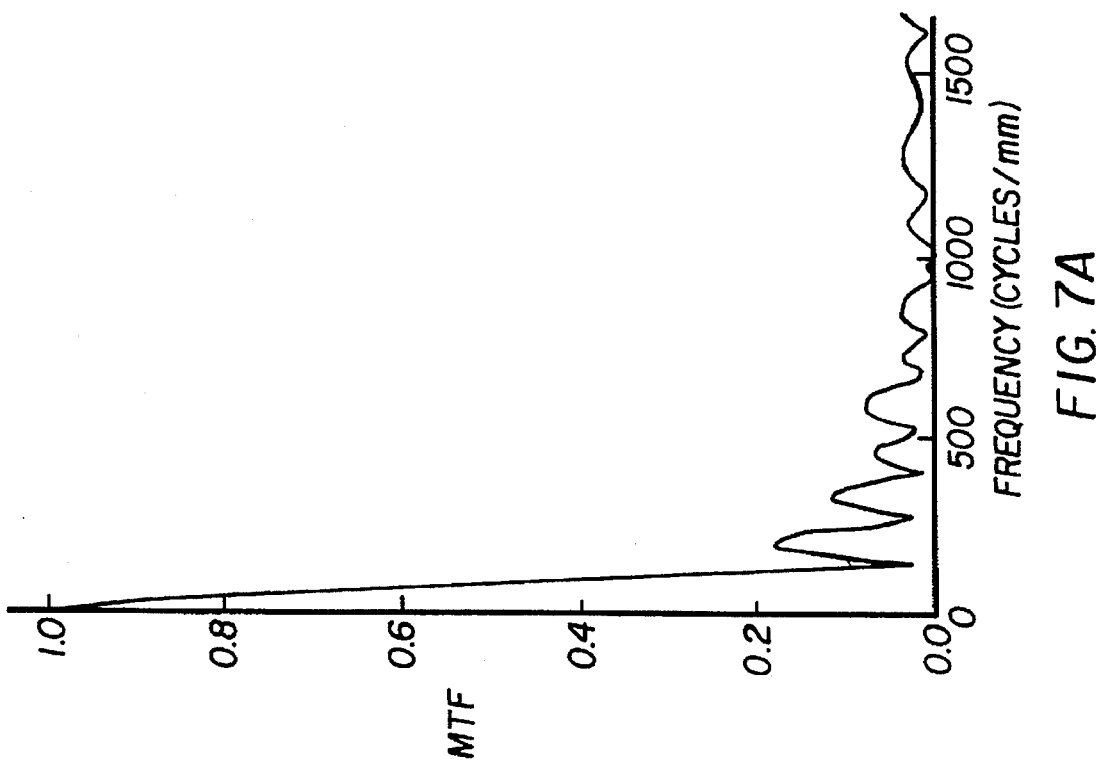

FIGS. 7a and 7b are MTF plots of the optics system of the first embodiment and show a good performance on and off axis at 10 cycles per mm.

The imaging system of the second embodiment is designed to operate at f/0.83. This system also operates at 1:1 image-object conjugates. The mirrors used in this imaging system has a general aspheric reflective surface shape.

The shape of the reflective surface is described by the equation:

$$Z = \frac{CX^2}{1 + \sqrt{1 - SC^2X^2}} + DX^4 + EX^6$$

C = −0.02
S = −0.2285
D = −2.1269 × 10⁻⁷
E = −3.64 × 10₋₁₁ where

Z is the sag of the surface at the radius value X,

C is a vertex curvature of the mirror surface,

S is a conic constant and

D and E are aspheric coefficients.

The distance between the object and the image plane (i.e., the array source to the photosensitive surface) is 32mm. The distance between the rear surface 29 of the first mirror 22 to the photosensitive surface 40 is 3 mm and the axial separation 32 between the two mirrors is 18 mm. The distance between the vertex of the second mirror 24 to the image plane P is 25 mm. The central portion 51 of the baffle B is 8 mm in diameter.

Figure 7D:
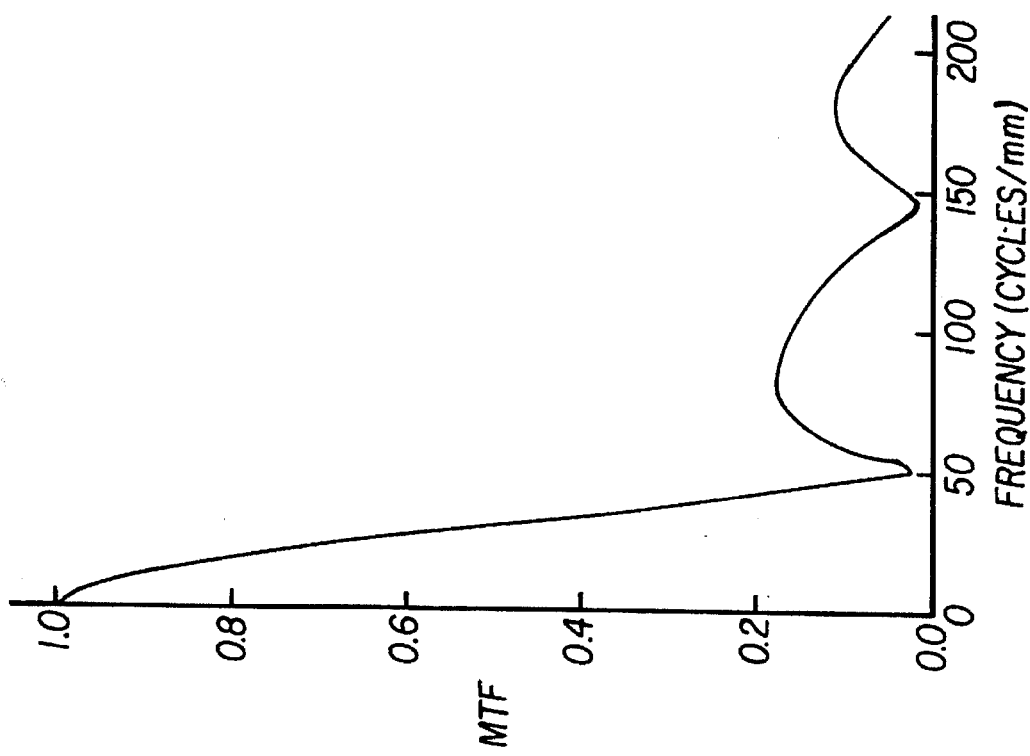
FIGS. 7c and 7d are graphs which illustrate the performance of an optical system made according to a second preferred embodiment of the present invention.
Figure 7C:
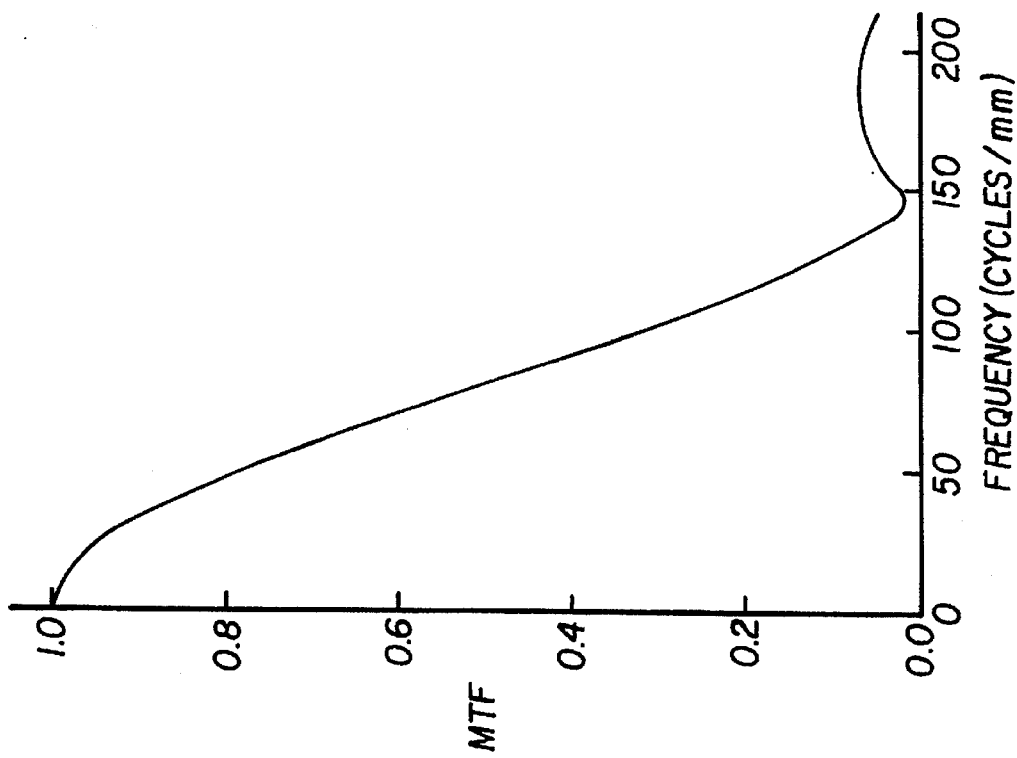

FIGS. 7c and 7d are MTF plots of the performance of the optics (i.e., imaging) system of the second embodiment. They show a good performance on and off axis at 10 cycles per mm.

While the exact apparatus for translating and rotating the LED array and the imaging system relative to the recording medium is not critical to this invention, a preferred embodiment of such apparatus will now be described with reference to FIGS. 8–10.

Figure 8:
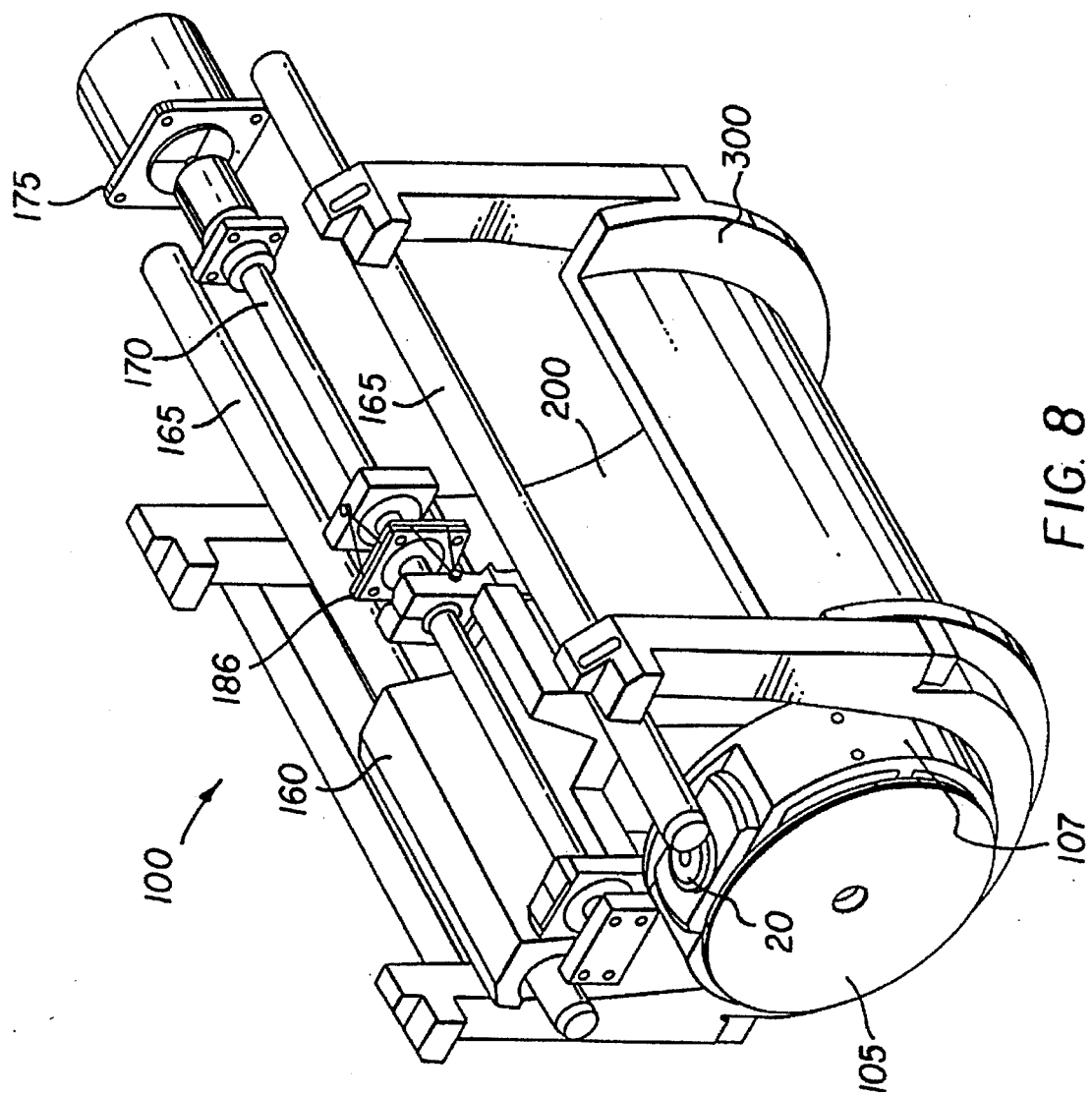
FIG. 8 is a perspective view of an electro-optic printer apparatus according to the preferred embodiment of the present invention and incorporating the optical system of FIG. 2. In this figure, certain elements are cut away to facilitate understanding of the structure and operation of the apparatus.
Figure 9:
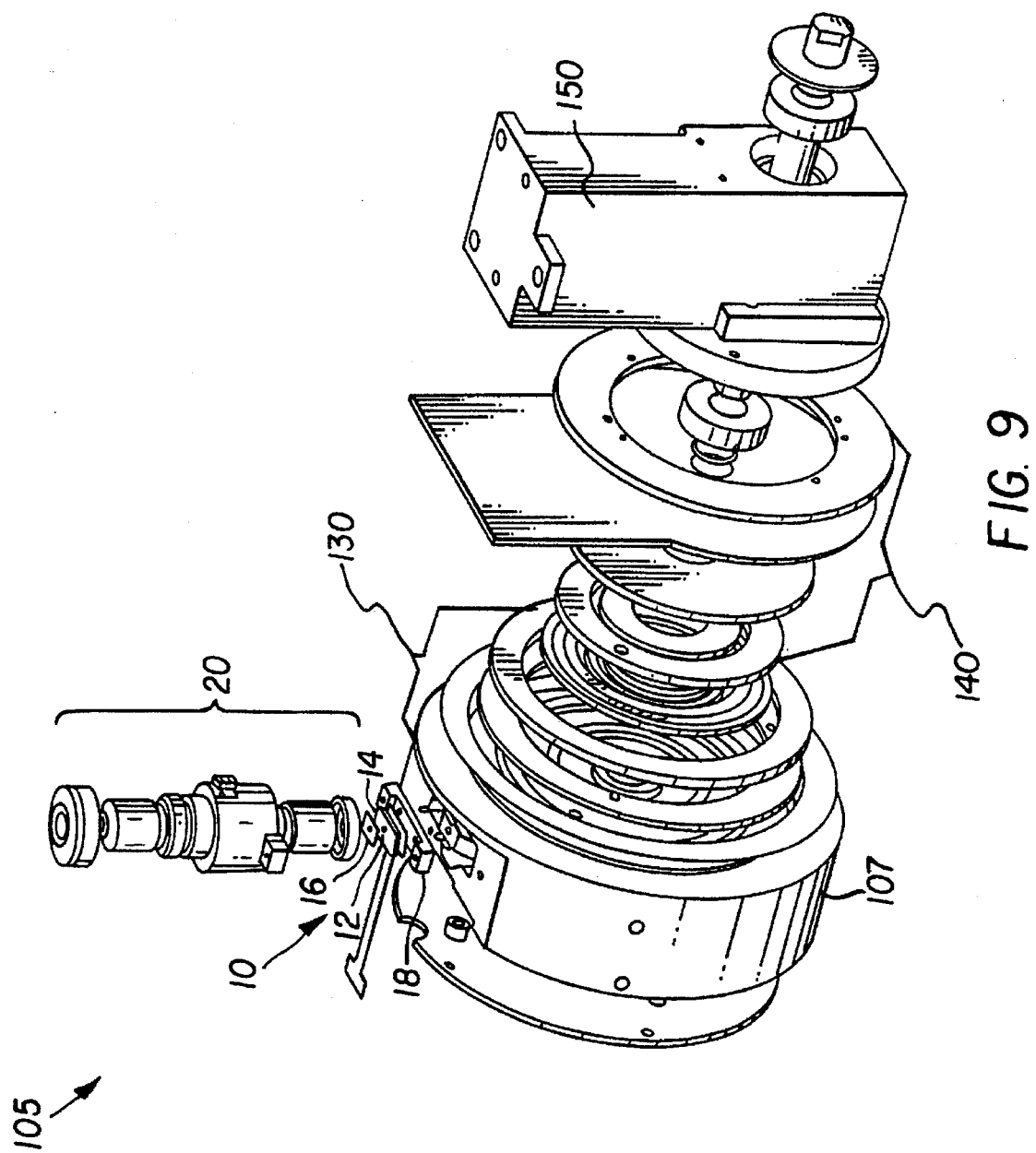
FIG. 9 is an exploded perspective view of a rotator disc assembly that forms a part of the electro-optic printer apparatus of FIG. 8.
Figure 10:
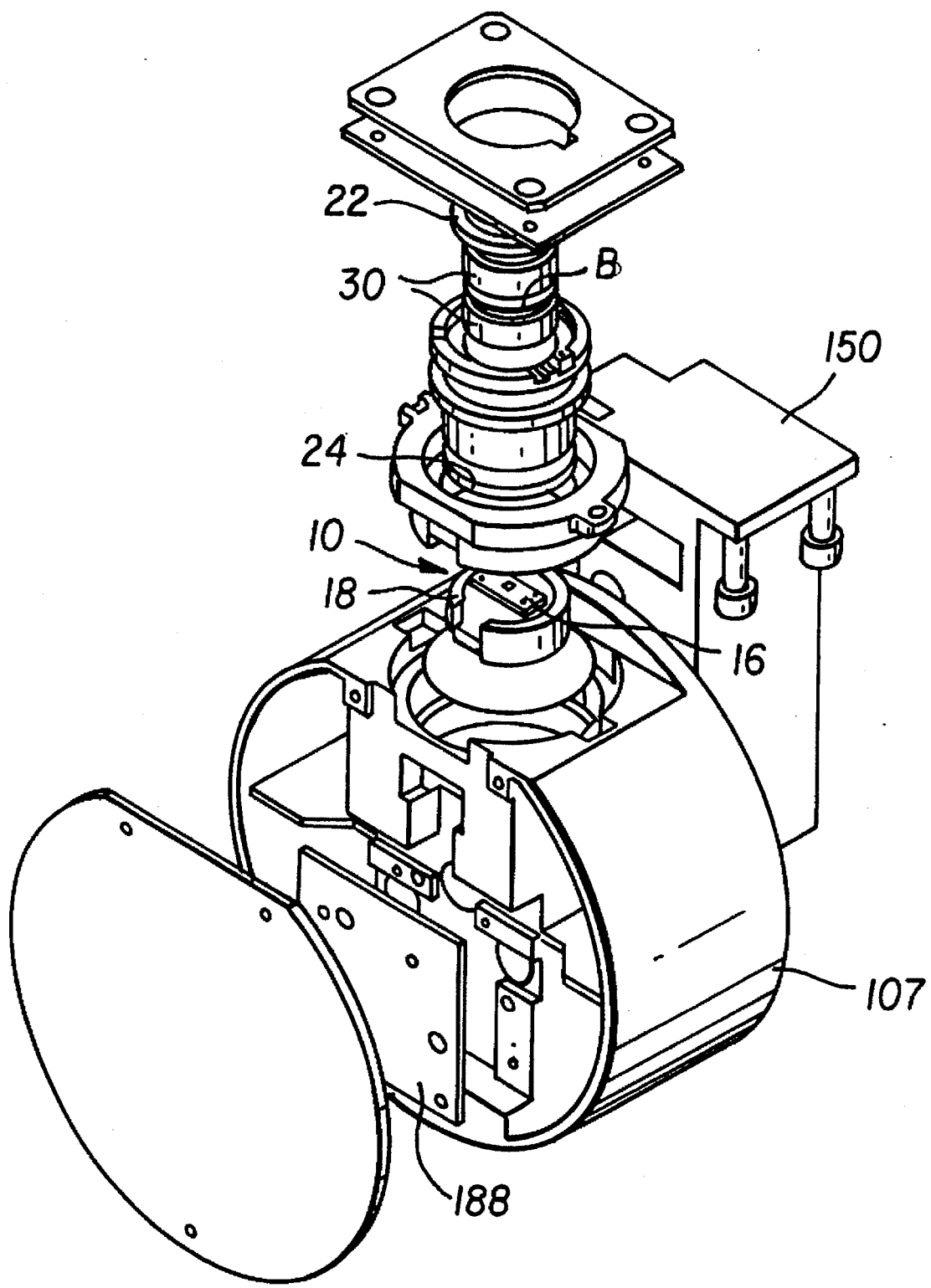
FIG. 10 is an exploded perspective view of a rotator disc assembly portion of the electro-optic apparatus of FIG. 8.

FIGS. 8, 9 and 10 show a perspective view of the printer apparatus 100 that includes the rotator assembly 105. As can be seen, the rotator assembly 105 comprises a rotator disc housing 107 which supports an LED printhead assembly 10 containing the LED light sources, such as the LED array 12 and a mirror reflective imaging system assembly 20 which are similar to that illustrated in FIGS. 1–4. As discussed above, activation of particular LEDs is controlled by driver circuits. Driver circuits for driving the LEDs with current are supported on a circuit board 188 positioned within the rotator disc housing 107 in such a way as to balance the weight of a rotator disc assembly so that the weight of the rotator disc assembly is evenly distributed to minimize vibrations during rotation. The rotational movement of the rotator disc assembly 105 is accomplished by a motor assembly 130 on the rotator disc assembly. The rotator disc assembly 105 also includes a rotary transformer assembly 140 for coupling data, clock, power and other signals to be provided to the LED printhead. The transformer assembly includes a stator portion that does not rotate and a rotor portion that does rotate. Signals are transferred from the stator to the rotor. Further details of the stator and rotor assembly are provided in copending U.S. Pat. Application Ser. No. 123,839, filed Sept. 20, 1993, in the names of Douglas H. Smith et al and entitled "Method and Apparatus for Exposing Photosensitive Media With Multiple Light Sources". A non-rotating pedestal 150 mounts the rotator disc assembly to a translator base 160 for translating movement along the axis of a cylinder defined by the cylindrically curved photosensitive recording medium. As can be seen in FIG. 8, a stationary print shoe 300 is provided and has a generally cylindrical internal configuration. The photosensitive medium 200 may be held in place either by its natural resiliency or by means such as clips or a vacuum applied through holes in the surface of the shoe. The means for supporting and for moving the rotator disc assembly 105 includes guide rails 165, lead screw 170 and a stepper motor 175. The translational movement of the rotator disc assembly 105 back and forth on guide rails 165 is controlled by the lead screw 170 and is accomplished or actuated by the stepper motor 175. The rotator disc assembly translates (or moves) back and forth on guide rails 165. The combination of the rotational movement and translational movement of the rotator disc housing 107 allows the imaging system 20 to scan the required portions of the photosensitive medium 200 in a series of helical scans. The stepper motor 175 may be off when the LEDs are facing the gap (i.e. dead space) between the ends of the medium. Thus, the translational movement may not be actuated when the rotator head is facing dead space. The wire flexure 186 keeps the looseness out of the nut and thread of the lead screw 1 70 to prevent bending of the lead screw.

With reference to FIG. 10, the LED printhead assembly 10 includes LED housing 18 for housing the LED array substrate 14, the LED array 12 itself and an LED cover glass 16.

The LED cover glass 16 as noted above is an aperture plate that has 12 apertures. The apertures are also arranged into a 3×4 matrix and are each smaller than a respective LED over which it is positioned. The location of the apertures correspond precisely to a desired revised location of each LED source of the LED array 12 on the LED assembly 10.

There has thus been described an electro-optic printer apparatus that features an all-reflective optical system. The optical system does not suffer from color aberrations, it can be manufactured with as few as two optical elements, is very compact, light weight, and operates at a very low-working F-number. For the LEDs and photographic papers used, an imaging system with a working number of over f/8, generally does not provide enough light to the image surface. However, imaging systems as described herein with a low-working F-number by which it is meant F-numbers that are less than 8.0 will provide enough light as long as non-spherical surfaces and enough light sources are used. It has also been found that imaging systems with very low-working F-numbers, i.e., a working F-number of f/2.0 or less provides enough light from very few light sources while being a cheaper alternative than alternatives such as refractive microscope objectives. Thus, an F-number of 2 or less and especially an F-number of about 1 is preferred.

The light sources may be stationary and the photosensitive medium moved relative thereto or combinations thereof. The photosensitive medium may be an external cylindrical configuration rather than internal. The light sensitive medium may be other than photographic film or paper, such as a photoconductive medium in the form of a belt or drum.

The invention may be used in a three mirror system for imaging the light source. Still other modifications contemplated are that one of the mirrors may be convex or one or more mirrors may be a Fresnel mirror, or the light sources may be located between the first and the second mirror. The light sources need not be plural LEDs. Other point-like light or other actinic radiation sources are contemplated including a single light source. For example, laser or a single LED or a small CRT may also be used.

The invention has been described in detail with particular reference to preferred embodiments thereof, but it will be understood that variations and modifications can be effected within the spirit and scope of the invention.

I claim:

1. An electro-optic printer apparatus for printing onto an associated imaging surface, said apparatus comprises:

(a) a matrix array of plural, discrete, point-like, light-emitting sources, said light-emitting sources emitting light in a plurality of colors;

(b) a single, non-refractive imaging system including a first mirror and a second mirror, said first mirror and said second mirror having a curved reflective surface with a space defined between the surfaces, the curved reflective surface of said first mirror facing the curved reflective surface of said second mirror, said first mirror having an outlet opening to permit light emitted by said light-emitting sources to propagate from said space, said light emitting sources being located adjacent to said second mirror and emitting said light towards said first mirror, said surfaces being curved and spaced so that said light from said light-emitting sources reflects from said first mirror towards said second mirror, then reflects from said second mirror and then propagates through said outlet opening and is imaged upon the associated imaging surface;

(c) means for supporting said imaging surface, the associated imaging surface being adjacent to said first mirror; and (d) a baffle located in said space and relative to said light emitting sources so as to block light emitted from said light emitting sources from propagating directly towards said imaging surface without reflecting in said imaging system.

2. The printer apparatus of claim 1, wherein each of said reflective surfaces are concave.

3. The printer apparatus of claim 1, wherein said light-emitting sources emit light in respective different colors.

4. The printer apparatus of claim 1 wherein said light-emitting sources are LEDs that emit, respectively, light in respective different colors.

5. The printer apparatus of claim 1, wherein at least one of said reflective surfaces is aspherical.

6. The printer apparatus of claim 2, wherein at least one of said reflective surfaces is aspherical.

7. The printer apparatus of claim 1, wherein each of the reflective surfaces of said mirrors is a conic section.

8. The printer apparatus of claim 1, wherein said sources emit light in red, green and blue colors, respectively.

9. A printer apparatus of claim 1, wherein each of the reflective surfaces of said mirrors are hyperbolic.

10. The printer apparatus of claim 3, wherein said sources emit light in red, green and blue colors, respectively.

11. The printer apparatus of claim 1 and wherein there are no refractive optics in an optical path between the light emitting sources and the imaging surface.

12. The printer apparatus of claim 1 wherein said second mirror includes an inlet opening aligned with said outlet opening in said first mirror for allowing light from the emitting sources to propagate into said space, said emitting sources being located proximate said inlet opening and external to said space and said baffle being located in said space between said curved surfaces and aligned with said inlet opening and outlet said opening.

13. The printer apparatus of claim 2 wherein said second mirror includes an inlet opening aligned with said outlet opening in said first mirror for allowing light from the emitting sources to propagate into said space, said emitting sources being located proximate said inlet opening and external to said space and said baffle being located in said space between said emitting surfaces and aligned with said inlet and outlet openings.

14. The printer apparatus of claim 13, wherein at least one of said reflective surfaces is aspherical.

15. The printer apparatus of claim 13, wherein each of the reflective surfaces of said mirrors is a conic section.

16. The printer apparatus of claim 13, wherein each of the reflective surfaces of said mirrors are hyperbolic.

17. The printer apparatus of claim 13, wherein said light-emitting sources emit light in respective different colors.

18. A printer device according to claim 1, wherein said imaging surface is located a distance, $d_1$, from the rear surface of said first mirror wherein 1 mm$<d_1<$5 mm.

19. A printer device according to claim 2, wherein said imaging surface is located a distance, $d_1$, from the rear surface of said first mirror wherein 1 mm$<d_1<$5 mm.

20. A printer apparatus according to claim 2, wherein said imaging system has the following parameters:

| Mirror | Reflective Aperture Diameter | Vertex Curvature* | Air Separation |
|---|---|---|---|
| near mirror | 21 mm | +0.02 mm$^{-1}$ | 18 mm |
| far mirror | 21 mm | −0.02 mm$^{-1}$ | 7 mm |

*Aspheric equation:
$$Z = \frac{CX^2}{1 + \sqrt{(1 - SC^2X^2)}}$$

where Z is a sag of the surface at a radius X, C is a surface curvature, S is a conic constant and S=−0.005.

21. A printer apparatus according to claim 2 wherein said imaging system has the following parameters:

| Mirror | Reflective Aperture Diameter | Vertex Curvature* | Air Separation |
|---|---|---|---|
| near mirror | 30 mm | +0.02 mm$^{-1}$ | 18 mm |
| far mirror | 30 mm | −0.02 mm$^{-1}$ | 7 mm |

*Aspheric equation:
$$Z = \frac{CX^2}{1 + \sqrt{1 - SC^2X^2}} + DX^4 + EX^6$$

$C = -0.02$ mm$^{-1}$ $S = -0.2285$ $D = -2.1269 \times 10^{-7}$ mm$^{-3}$ $E = -3.64 \times 10^{-11}$ mm$^{-5}$ where Z is a sag of the surface at a radius value X, C is a vertex curvature of the mirror surface, S is a conic constant and D and E are aspheric coefficients.

22. A printer apparatus comprising:

(a) a matrix of light emitting sources, said sources emitting light of different colors from different point-like locations;

(b) a single, non-refractive imaging system that images light to an image plane and which does not use any refractive optics, said imaging system being substantially free of chromatic aberration and including plural mirrors positioned in an optical path so as to provide reflection of the light between the mirrors, one of the mirrors including an outlet opening therein to allow light to exit a space between the mirrors; and (c) means for supporting an imaging surface located external to said space and proximate said outlet opening and upon which an image of light from said light source is formed.

23. The printer apparatus of claim 22 and including a light control means for blocking propagation of light directly from said light sources to said image plane.

24. The printer apparatus of claim 22, wherein said imaging surface is located a distance, $d_1$, from a rear surface of said mirror having an outlet opening, wherein $1\ mm < d_1 < 5\ mm$.

25. The printer apparatus of claim 23, wherein said imaging surface is located a distance, $d_1$, from a rear surface of said mirror having an outlet opening, wherein $1\ mm < d_1 < 5\ mm$.

26. A printer apparatus comprising:

a single, non-refractive imaging system including a pair of reflector members disposed in opposed relationship with an air space gap therebetween, the opposed surfaces of said reflector members providing light reflecting surfaces;

a light source disposed adjacent one of the reflector members for emitting light into said air space gap between said reflector members;

a light sensitive medium disposed at or adjacent the other of said reflector members for receiving a light beam passed thereto under repetitive reflections between said reflector members; and a non-transparent member disposed in said air gap between said reflector members, said non-transparent member preventing light from the light source from propagating directly to the light sensitive medium without reflection from the reflector members.

27. A method for printing images comprising:

(i) generating light from a light source that outputs light in a plurality of colors at a plurality of descrete, point-like light source locations;

(ii) reflecting the light between reflecting surfaces of two mirrors, at least one of which mirrors has an aperture, so that reflections of image-forming light beams each follow a series of zigzag turns within a space between the mirrors and converge through the aperture to exit the space between the mirrors and form an image on a light sensitive surface without passing through refracting optics, wherein a non-transparent member, disposed in a line path between said reflecting surfaces, blocks light of said light source from directly reaching said light receiving surface and permits only light repetitively reflected between the reflecting surfaces of said mirrors to be imaged on said surface.

* * * * *